United States Patent
Bagnall et al.

(10) Patent No.: US 7,200,999 B2
(45) Date of Patent: Apr. 10, 2007

(54) ARRANGEMENT FOR BLEEDING THE BOUNDARY LAYER FROM AN AIRCRAFT ENGINE

(75) Inventors: Adam M Bagnall, Derby (GB); Christopher Freeman, Nottingham (GB)

(73) Assignee: Rolls-Royce plc, London (GB)

(*) Notice: Subject to any disclaimer, the term of this patent is extended or adjusted under 35 U.S.C. 154(b) by 172 days.

(21) Appl. No.: 10/951,912

(22) Filed: Sep. 29, 2004

(65) Prior Publication Data

US 2005/0081530 A1  Apr. 21, 2005

(30) Foreign Application Priority Data

Oct. 15, 2003  (GB) ................ 0324127.0

(51) Int. Cl.
*F02C 6/04* (2006.01)
(52) U.S. Cl. ............ 60/785; 60/226.1; 60/262
(58) Field of Classification Search ............ 60/785, 60/262, 226.1; 415/144, 211.2
See application file for complete search history.

(56) References Cited

U.S. PATENT DOCUMENTS

| | | | | |
|---|---|---|---|---|
| 3,020,709 | A * | 2/1962 | Bertin et al. ............ | 60/771 |
| 3,041,822 | A * | 7/1962 | Embree .................. | 60/242 |
| 3,319,593 | A | 5/1967 | Papst | |
| 3,993,414 | A | 11/1976 | Meauze | |
| 4,182,119 | A * | 1/1980 | Hurley .................. | 60/226.1 |
| 4,255,083 | A * | 3/1981 | Andre et al. ............ | 415/119 |
| 4,711,084 | A * | 12/1987 | Brockett ................. | 60/785 |
| 5,048,288 | A * | 9/1991 | Bessette et al. .......... | 60/226.1 |
| 5,123,242 | A * | 6/1992 | Miller .................. | 60/226.1 |
| 5,568,724 | A | 10/1996 | Lindner | |
| 5,729,969 | A | 3/1998 | Porte | |
| 5,732,547 | A * | 3/1998 | Olsen et al. ............ | 60/204 |
| 5,782,077 | A * | 7/1998 | Porte .................... | 60/782 |
| 6,055,805 | A * | 5/2000 | El-Aini et al. .......... | 60/226.1 |
| 6,125,626 | A * | 10/2000 | El-Aini et al. .......... | 60/226.1 |
| 6,701,716 | B2 * | 3/2004 | Rayer et al. ............ | 60/782 |
| 2002/0134891 | A1 | 9/2002 | Guillot | |
| 2003/0182925 | A1 * | 10/2003 | Lair ..................... | 60/226.1 |

FOREIGN PATENT DOCUMENTS

| | | |
|---|---|---|
| GB | 678085 P | 8/1952 |
| GB | 814745 | 6/1959 |
| GB | 1085227 P | 9/1967 |

* cited by examiner

*Primary Examiner*—William H. Rodriguez
(74) *Attorney, Agent, or Firm*—W. Warren Taltavull; Manelli Denison & Selter PLLC

(57) ABSTRACT

An aircraft engine comprising a nacelle, a first wall and fan outlet guide vanes. The fan outlet guide vanes comprises a plurality of stator vanes extending between a second wall and a third wall. The nacelle having apertures at a region of low pressure. A means to bleed fluid from a region of high pressure at one or more of the first wall, the second wall, the third wall or the stator vanes and at least one duct to connect the means to bleed fluid from the region of high pressure to the at least one aperture in the nacelle. The static pressure at the high pressure region is greater than that in the low pressure region such that at least some of the boundary layer of the fluid flows through the at least one duct to the at least one aperture in the nacelle.

18 Claims, 3 Drawing Sheets

ARRANGEMENT FOR BLEEDING THE BOUNDARY LAYER FROM AN AIRCRAFT ENGINE

FIELD OF THE INVENTION

The present invention relates to an arrangement for bleeding the boundary layer from an aircraft engine, particularly to a gas turbine engine and in particular to a turbofan gas turbine engine.

BACKGROUND OF THE INVENTION

The fan of a turbofan gas turbine is required to generate thrust by increasing the pressure of the air-flow through the fan, or bypass, duct and in addition the fan may be used to supercharge the core engine of the gas turbine engine. Stator vanes are required in the airflow through the fan duct and in the airflow to the core engine to remove the swirl of the air from and to increase the static pressure of the air by extracting kinetic energy from the airflow.

As the pressure ratio increases to provide more thrust from the airflow through the fan duct or to provide more supercharging of the core engine, more aerodynamic loading is imposed on the stator vanes, especially if the fan speed is limited to increase rotor efficiency. As the aerodynamic loading increases it is more difficult for the airflow to sustain the pressure rise without separation of the airflow from the air washed surfaces of the components, especially near the end walls between the stator vanes, where the annulus boundary layer flow over the end walls interacts with the vane boundary layer flow over the vanes.

It is known to control the separation of the boundary layer on a surface by using a pump to suck the boundary layer from the surface. This arrangement requires the use of a pump. It is also known to remove the boundary layer from the compressor at a position and to return the boundary layer to the compressor upstream of the position. This arrangement reintroduces high temperature air into the compressor and inherently requires more shaft work to achieve a given pressure ratio than if the low temperature air were removed from the compressor.

SUMMARY OF THE INVENTION

Accordingly the present invention seeks to provide a novel aircraft engine, which reduces, preferably overcomes, the above-mentioned problems.

Accordingly the present invention provides an aircraft engine comprising a nacelle and a stator structure having a surface, the nacelle defining an aerodynamic shape for a fluid, the nacelle having at least one aperture at a region of relatively low pressure, means to bleed fluid from a region of relatively high pressure on the surface of the stator structure, at least one duct to connect the means to bleed fluid from the region of relatively high pressure on the surface of the stator structure to the at least one aperture in the nacelle at the region of relatively low pressure, whereby in operation the static pressure at the region of high pressure being greater than the static pressure at the region of relatively low pressure such that at least some of the boundary layer of the fluid on the surface of the stator structure flows through the at least one duct to the at least one aperture in the nacelle.

Preferably the stator structure comprises a first wall around a set of rotor blades or at least one set of stator vanes.

The at least one set of stator vanes comprises a plurality of stator vanes extending between a second wall and a third wall.

The nacelle having a highlight and a chord length.

Preferably the region of relatively low pressure extends between 50% and 70% of the chord length of the nacelle from the highlight of the nacelle.

Preferably the region of relatively low pressure extends between 55% and 65% of the chord length of the nacelle from the highlight of the nacelle.

The means to bleed fluid from at least one of the first wall, the second wall or the vanes may comprise a porous member, the porous member may comprise a porous metal or a porous composite.

Preferably the aperture in the nacelle is arranged in a nozzle and the nozzle is arranged to direct the bled boundary layer in a predetermined direction.

Preferably the nozzle is arranged to direct the bled boundary layer in a direction to provide additional thrust.

Preferably the aircraft engine is a gas turbine engine. Preferably the gas turbine engine is a turbofan gas turbine engine.

Preferably the set of rotor blades is a set of fan blades. The set of stator vanes may be a set of fan outlet guide vanes. The set of stator vanes may be a set of core inlet guide vanes. Preferably there is a set of fan outlet guide vanes and a set of core inlet guide vanes.

BRIEF DESCRIPTION OF THE DRAWINGS

The present invention will be more fully described by way of example with reference to the accompanying drawings in which.

DETAILED DESCRIPTION OF THE INVENTION

Figure 1:
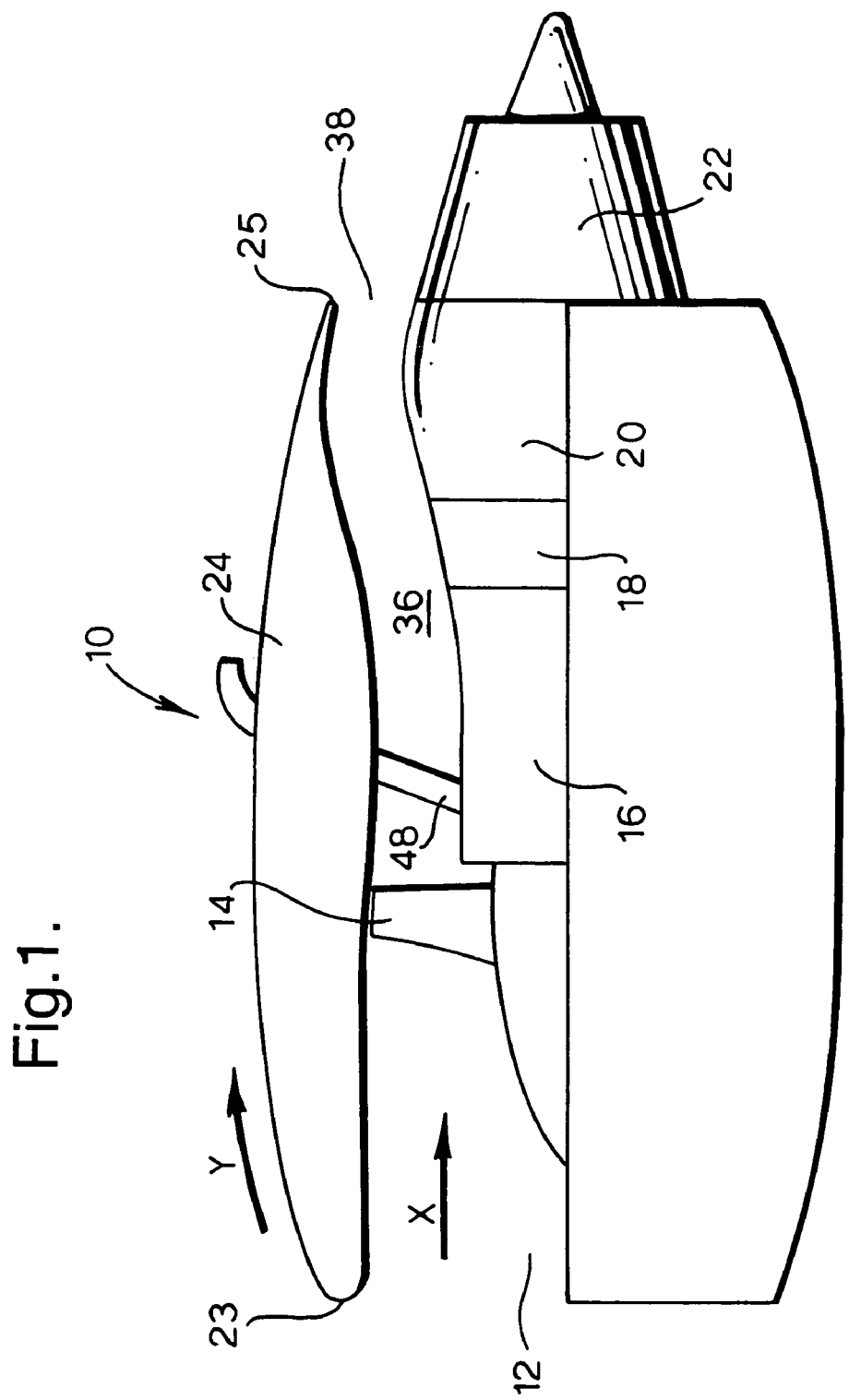
FIG. 1 is a view of a turbofan gas turbine engine having an arrangement for bleeding the boundary layer according to the present invention.
Figure 2:
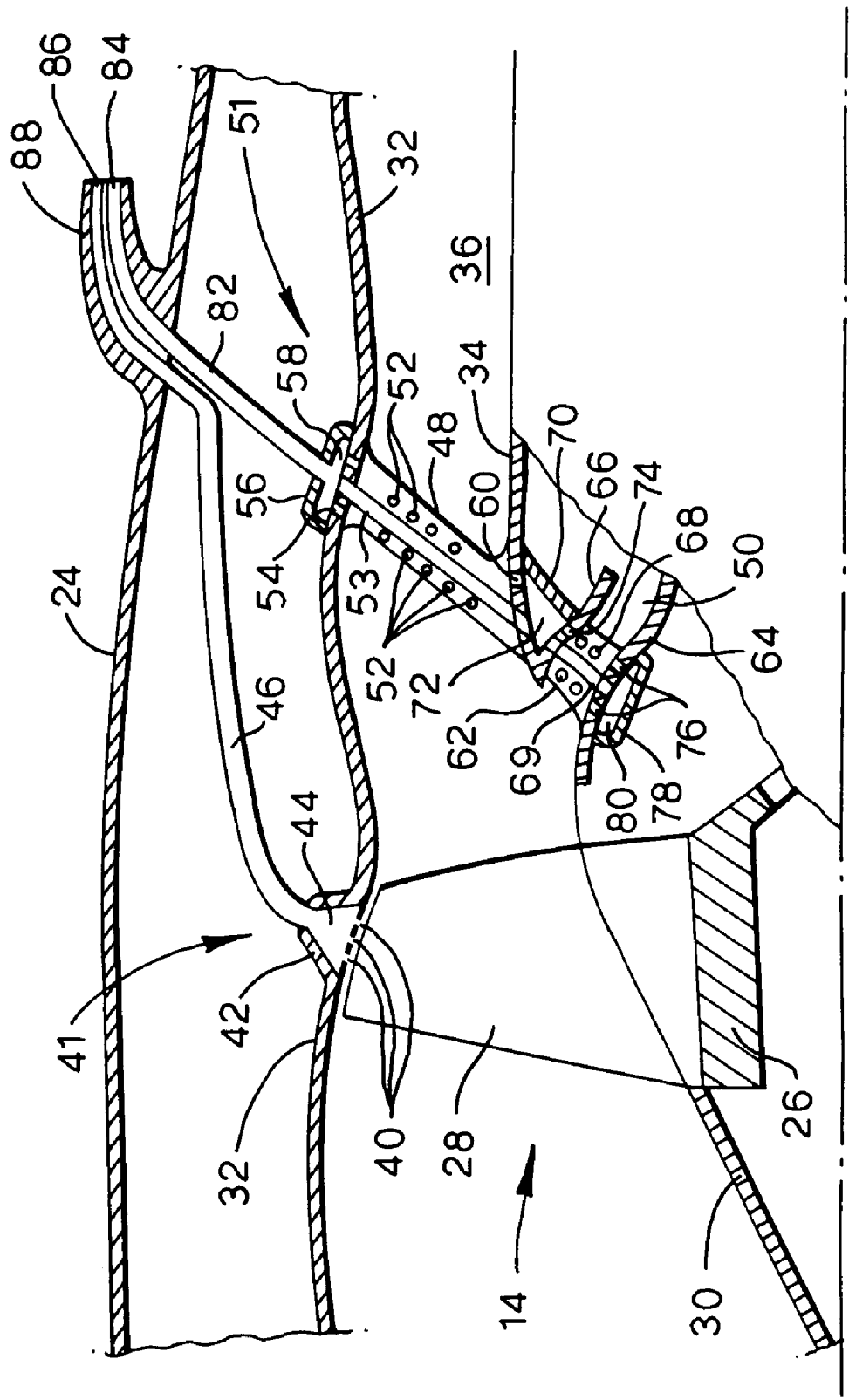
FIG. 2 is an enlarged cut away view of the turbofan gas turbine engine shown in FIG. 1, showing the arrangement for bleeding the boundary layer.

A turbofan gas turbine engine 10, as shown in FIG. 1, comprises in axial flow series an intake 12, a fan section 14, a compressor section 16, a combustion section 18, a turbine section 20 and an exhaust nozzle 22. The turbine section 20 comprises one or more low-pressure turbines (not shown) to drive a fan 26 and 28 (as shown in FIG. 2) in the fan section 14 and one or more high-pressure turbines to drive a high-pressure compressor (not shown) in the compressor section 16. The turbine section 20 may also comprise one or more intermediate-pressure turbines (not shown) to drive an intermediate-pressure compressor (not shown) in the compressor section 16. The turbofan gas turbine engine 10 also comprises a nacelle 24 arranged coaxially with the turbofan gas turbine engine 10. The nacelle 24 defines a generally convex aerodynamic shaped surface. The nacelle 24 has a highlight at its upstream end 23 and the nacelle 24 has a chord length extending from the upstream end 23 to the downstream end 25.

The turbofan gas turbine engine 10, as shown more clearly in FIG. 2, comprises a fan rotor 26, which carries a plurality of circumferentially spaced radially extending fan blades 28. The fan rotor 26 also carries a nose cone 30. A fan casing 32 is arranged coaxially around the fan blades 28 and the fan casing 32 is secured to the nacelle 24. The fan casing 32 defines a fan duct 36 with a core engine casing 34 and the fan duct 36 has a fan exhaust 38 (as shown in FIG. 1).

The turbofan gas turbine engine 10 has an arrangement 41 and/or 51 for bleeding the boundary layer from various regions of the static structure of the turbofan gas turbine engine 10.

An arrangement 41 for bleeding the boundary layer from the region of the fan casing 32 adjacent the tips of the fan blades 28 is provided, as shown in FIG. 2. The arrangement 41 comprises a plurality of apertures 40 which extend through the fan casing 32 in the region adjacent the tips of the fan blades 28 to interconnect with an annular chamber 44 defined by an annular wall 42 secured to the outer surface of the fan casing 32. Thus the region of the fan casing 32 adjacent the tips of the fan blades 28 is porous. The annular chamber 44 is connected to an aperture 86 in the nacelle 24 by a duct 46.

A plurality of fan outlet guide vanes 48 are spaced apart circumferentially and extend radially across the fan duct 36 between the fan casing 32 and the core engine casing 34. The fan outlet guide vanes 48 are secured to the fan casing 32 and the core engine casing 34. A plurality of core engine inlet guide vanes 62 are spaced apart circumferentially and extend radially across a duct 50 leading to the core engine. The core engine inlet guide vanes 62 are secured to an inner wall 64 and an outer wall 66.

Figure 3:
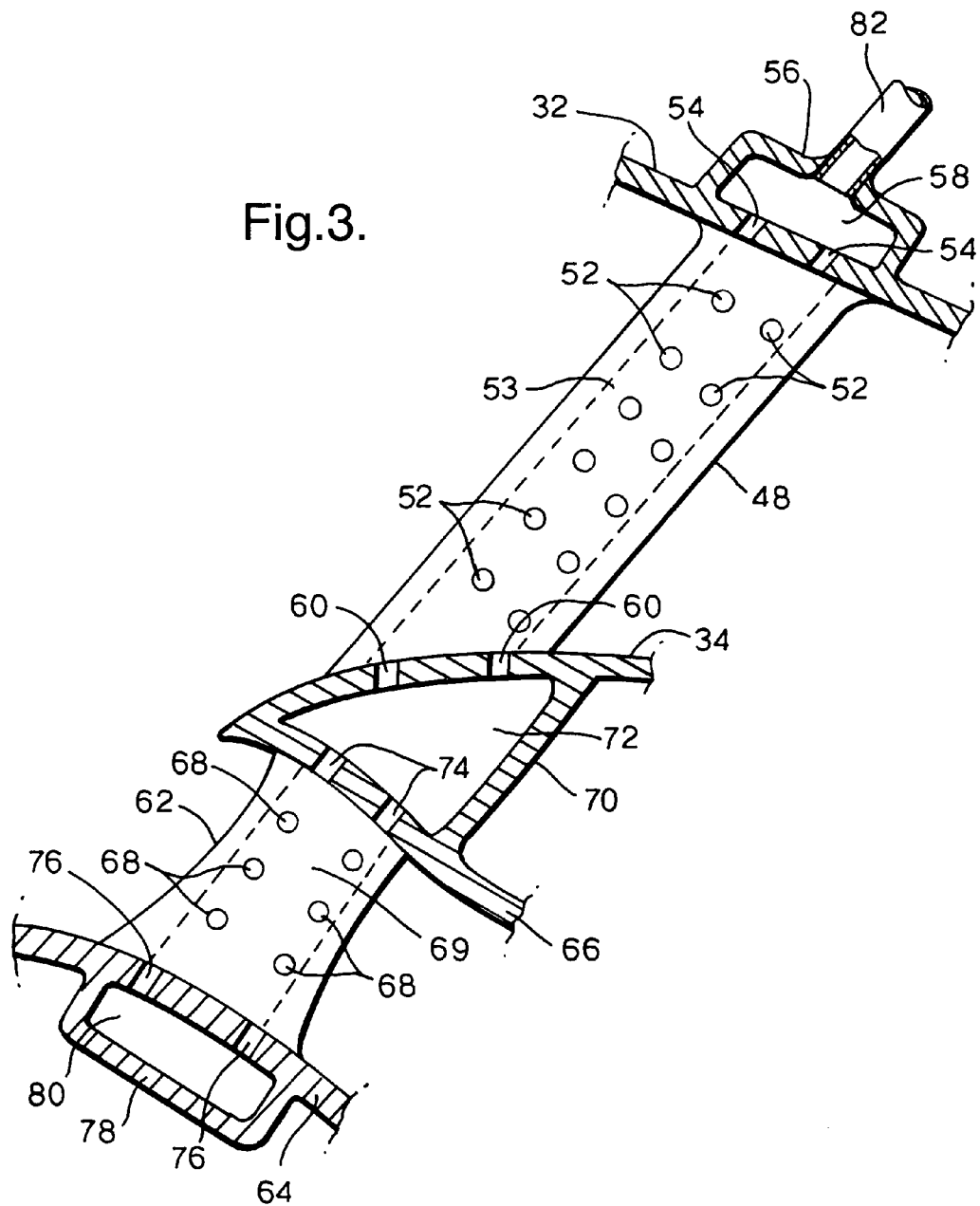
FIG. 3 is a further enlarged view of a fan outlet guide vane and inlet guide vane shown in FIG. 2.

An arrangement 51 for bleeding the boundary layer from the fan outlet guide vanes 48 and the inlet guide vanes 62 is provided, as shown more clearly in FIG. 3. The fan outlet guide vanes 48 are hollow and each fan outlet guide vane 48 has a duct 53 extending radially therethrough from the core engine casing 34 to the fan casing 32. Each fan outlet guide vane 48 is porous and is provided with apertures 52 which extend from the convex suction surface and/or the concave suction surface to the duct 53. The apertures 52 are provided at any suitable region, or regions, of the convex suction surface and/or concave pressure surface, which suffer from boundary layer separation.

The fan casing 32 is porous in the region circumferentially between adjacent fan outlet guide vanes 48 and is provided with apertures 54, which extend through the fan casing 32 to an annular chamber 58 defined by an annular wall 56 secured to the outer surface of the fan casing 32. The annular chamber 58 is connected to the aperture 84 in the nacelle 24 by a duct 82. The apertures 54 are provided at any suitable region, or regions, which suffer from boundary layer separation.

The core engine casing 34 is porous in the region circumferentially between adjacent fan outlet guide vanes 48 and is provided with apertures 60, which extend through the core engine casing 32 to an annular chamber 72 defined by an annular wall 70 secured to the inner surface of the core engine casing 34 and the outer wall 66. The annular chamber 72 is connected to the aperture 84 in the nacelle 24 by the ducts 53 through the fan outlet guide vanes 48, the annular chamber 58 and the duct 82. The apertures 60 are provided at any suitable region, or regions, which suffer from boundary layer separation.

The outer wall 66 is porous in the region circumferentially between adjacent core engine inlet guide vanes 62 and is provided with apertures 74, which extend through the outer wall 66 to the annular chamber 72 defined by an annular wall 70 secured to the inner surface of the core engine casing 34 and the outer wall 66. The apertures 74 are provided at any suitable region, or regions, which suffer from boundary layer separation.

The core engine inlet guide vanes 62 are hollow and each inlet guide vane 62 has a duct 69 extending radially therethrough from the inner wall 64 to the outer wall 66. Each core engine inlet guide vane 62 is porous and is provided with apertures 68 which extend from the convex suction surface and/or the concave suction surface to the duct 69. The apertures 68 are provided at any suitable region, or regions, of the convex suction surface and/or concave pressure surface, which suffer from boundary layer separation.

The inner wall 64 is porous in the region circumferentially between adjacent core engine inlet guide vanes 62 and is provided with apertures 76, which extend through the inner wall 64 to an annular chamber 80 defined by an annular wall 78 secured to the inner surface of the core inner wall 64. The apertures 76 are provided at any suitable region, or regions, which suffer from boundary layer separation. The annular chamber 80 is connected to the aperture 84 in the nacelle 24 by the ducts 69 through the core engine inlet guide vanes 62, the annular chamber 72, the ducts 53 through the fan outlet guide vanes 48, the annular chamber 58 and the duct 82.

The apertures 84 and 86 are arranged in a region of relatively low pressure of the nacelle 24 between a position at 50% of the chord length of the nacelle 24 from the highlight 42 to a position at 70% of the chord length of the nacelle 24 from the highlight 42 of the nacelle 24. Preferably the region of relatively low pressure extends between a position at 55% of the chord length of the nacelle 24 from the highlight 42 to a position at 65% of the chord length of the nacelle 24 from the highlight 43 of the nacelle 24. The aperture 84 and 86 are preferably arranged at the downstream end of a nozzle 86, and the apertures 84 and 86 are directed in a downstream direction towards the downstream end 25 of the nacelle 24.

In operation during flight, at least during cruise conditions, at relatively high Mach numbers, of the aircraft, there is an internal fluid, air, flow X through the nacelle 24 to the turbofan gas turbine engine 10 and an external fluid, air, flow Y over the outer surface of the nacelle 24. Due to the aerodynamic shape of the outer surface of the nacelle 24 a favourable pressure gradient is generated around the profile of the nacelle 24. In particular the static pressure at the region of the fan casing 32 adjacent the tips of the fan blades 28 is greater than the static pressure at the region of the nacelle 24 where the apertures 86 is positioned. Also the static pressure at the regions of the fan casing 32 between the fan outlet guide vanes 48, the static pressure at the regions of the core engine casing 34 between the fan outlet guide vanes 48, the static pressure at the convex and concave surfaces of the fan outlet guide vanes 48, the static pressure at the regions of the outer wall 66 between the core engine inlet guide vanes 62, the static pressure at the regions of the inner wall 64 between the core engine inlet guide vanes 62 and the static pressure at the convex and concave surface of the core engine inlet guide vanes 62 are all greater than the static pressure at the region of the nacelle 24 where the aperture 84 is positioned.

This pressure difference causes at least some of the boundary layer of the fluid, air, on the fan casing 32 to flow through the apertures 40 into the chamber 44 and then through the duct 46 to the at aperture 86 in the nacelle 24. This pressure difference causes at least some of the boundary layer of the fluid, air, on the regions of the fan casing 32 between the fan outlet guide vanes 48 to flow through the apertures 54 into the chamber 58 and through the duct 82 to the aperture 84 in the nacelle 24. The pressure difference causes at least some of the boundary layer of the fluid, air, on the convex and concave surfaces of the fan outlet guide vanes 48 to flow through the apertures 54 into the ducts 53 and then through the chamber 58 and duct 82 to the aperture 84. The pressure difference causes at least some of the boundary layer of the fluid, air, on the regions of the core engine casing 34 between the fan outlet guide vanes 48 to flow through the apertures 60 into the chamber 72 and then through the ducts 53, the chamber 58 and the duct 82 to the aperture 84.

The pressure difference causes at least some of the boundary layer of the fluid, air, on the regions of the outer wall 66 to flow through the apertures 74 into the chamber 72 and then through the ducts 53, the chamber 58 and the duct 82 to the aperture 84. The pressure difference causes at least some of the boundary layer of the fluid, air, on the convex and concave surfaces of the core engine inlet guide vanes 62 to flow through the apertures 68 into the ducts 69 and then through the chamber 72, the ducts 53, the chamber 58 and the duct 82 to the aperture 84. The pressure difference also causes at least some of the boundary layer of the fluid, air, on the regions of the inner wall 4 between the core engine inlet guide vanes 62 to flow through the apertures 76 into the chamber 80 and then through the ducts 69, the chamber 72, the ducts 53, the chamber 58 and the duct 82 to the aperture 84.

Preferably the apertures 84 and 86 are arranged to direct the bled fluid in a downstream direction to provide additional thrust.

The fan 14 may be a highly loaded fan for near sonic flight conditions and the aerodynamic loading of the fan blades 28 is chosen such that it does not require additional aerodynamic devices to avoid separation of the airflow on the aerofoil surfaces. However, the loading on the fan 14 is such that a very high air velocity is presented to the fan outlet guide vanes 48 and the core engine inlet guide vanes 62. The aerodynamic loading, due to the required deceleration of the fluid flow to a sensible velocity within the downstream duct may be in excess of normally accepted limits. The consequent aerodynamic loading is controlled by venting of the low energy fluid from critical locations on the fan outlet guide vanes 48 and the core engine inlet guide vanes 62, the convex and/or concave aerofoil surfaces and the surfaces connecting the stator vanes.

The advantage of the present invention is that high stage aerodynamic loading may be achieved with good efficiency, high-pressure ratio may be achieved in a single stage without excessive rotational speed of the rotor. The removal of the boundary layer provides improved aerodynamic stability and reduces sensitivity to aerodynamic disturbances and aerodynamic distortions. Excess pressure differences within the bleed system are used to provide additional thrust. There is no need for a pump, valve to bleed the boundary layer from the stator vanes and rotor casing during normal cruise conditions because the natural pressure difference is utilised. There are no bleeds or ducts required in the highly stressed rotor components, rotor blades and rotor discs.

Although the present invention has been described with reference to a turbofan gas turbine engine, the present invention is applicable to other aircraft engines.

Although the present invention has been described with reference to bleeding fluid through the fan casing around the fan rotor it may be possible to bleed fluid through a compressor casing around a compressor rotor.

Similarly although the present invention has been described with reference to bleeding fluid through the fan outlet guide vanes and/or inlet guide vanes it may be possible to bleed fluid through other compressor vanes.

It may be possible to bleed fluid from any one or more of the positions mentioned to obtain the benefits of the invention. It may be possible to bleed fluid from any other position on a suitable stator structure.

Although the present invention has been described with reference to the provision of apertures to provide the porous member it may be possible for the porous member to be a metal foam or a composite foam. The porous member may be a porous metal or a porous composite.

We claim:

1. An aircraft engine comprising a nacelle and a stator structure having a surface, the nacelle defining an aerodynamic shape for a fluid, the nacelle having at least one aperture at a region of relatively low pressure, means to bleed fluid from a region of relatively high pressure on the surface of the stator structure, at least one duct to connect the means to bleed fluid from the region of relatively high pressure on the surface of the stator structure to the at least one aperture in the nacelle at the region of relatively low pressure, whereby the static pressure at the region of high pressure being greater than the static pressure at the region of relatively low pressure such that at least some of the boundary layer of the fluid on the surface of the stator structure flows through the at least one duct to the at least one aperture in the nacelle, the stator structure comprising at least one set of stator vanes, the at least one set of stator vanes comprising a plurality of stator vanes extending between a first wall and a second wall, the surface is a surface of at least one of the first wall, the second wall and the stator vanes wherein the nacelle includes a highlight and a chord length wherein the region of relatively low pressure extends between 50% and 70% of the chord length of the nacelle from the highlight of the nacelle.

2. An aircraft engine as claimed in claim 1 wherein the region of relatively low pressure extends between 55% and 65% of the chord length of the nacelle from the highlight of the nacelle.

3. An aircraft engine as claimed in claim 1 wherein the means to bleed fluid from the stator structure comprises a porous member.

4. An aircraft engine as claimed in claim 3 wherein the porous member comprises a porous metal or a porous composite.

5. An aircraft engine as claimed in claim 1 wherein the surface of the stator vanes is a convex suction surface.

6. An aircraft engine as claimed in claim 1 wherein the surface of the stator vanes is a concave pressure surface.

7. An aircraft engine as claimed in claim 1 wherein the aperture in the nacelle is arranged in a nozzle and the nozzle is arranged to direct the bled boundary layer in a predetermined direction.

8. An aircraft engine as claimed in claim 7 wherein the nozzle is arranged to direct the bled boundary layer in a direction to provide additional thrust.

9. An aircraft engine as claimed in claim 1 wherein the aircraft engine is a gas turbine engine.

10. An aircraft engine as claimed in claim 9 wherein the gas turbine engine is a turbofan gas turbine engine.

11. An aircraft engine as claimed in claim 1 wherein the set of stator vanes is a set of fan outlet guide vanes.

12. An aircraft engine as claimed in claim 1 wherein the set of stator vanes is a set of inlet guide vanes.

13. An aircraft engine comprising a nacelle and a stator structure having a surface, the nacelle defining an aerodynamic shape for a fluid, the nacelle having at least one aperture at a region of relatively low pressure, means to bleed fluid from a region of relatively high pressure on the surface of the stator structure, at least one duct to connect the means to bleed fluid from the region of relatively high pressure on the surface of the stator structure to the at least one aperture in the nacelle at the region of relatively low pressure, whereby in operation the static pressure at the region of high pressure being greater than the static pressure at the region of relatively low pressure such that at least some of the boundary layer of the fluid on the surface of the stator structure flows through the at least one duct to the at least one aperture in the nacelle, the stator structure comprises at least one set of stator vanes, the at least one set of stator vanes comprises a plurality of stator vanes extending between a first wall and a second wall, the surface is a surface of at least one of the first wall, the second wall and the stator vanes, and the at least one aperture is arranged to direct the bled boundary layer in a direction to provide additional thrust.

14. An aircraft engine as claimed in claim 13 wherein the means to bleed fluid from the stator structure comprises a porous member.

15. An aircraft engine as claimed in claim 13 wherein the set of stator vanes is a set of fan outlet guide vanes.

16. An aircraft engine as claimed in claim 13 wherein the set of stator vanes is a set of inlet guide vanes.

17. An aircraft engine comprising a nacelle and a stator structure having a surface, the nacelle defining an aerodynamic shape for a fluid, the nacelle having at least one aperture at a region of relatively low pressure, means to bleed fluid from a region of relatively high pressure on the surface of the stator structure, at least one duct to connect the means to bleed fluid from the region of relatively high pressure on the surface of the stator structure to the at least one aperture in the nacelle at the region of relatively low pressure, whereby in operation the static pressure at the region of high pressure being greater than the static pressure at the region of relatively low pressure such that at least some of the boundary layer of the fluid on the surface of the stator structure flows through the at least one duct to the at least one aperture in the nacelle, the stator structure comprises a first wall around a set of rotor blades, the surface is a surface of the first wall and the at least one aperture is arranged to direct the bled boundary layer in a direction to provide additional thrust.

18. An aircraft engine as claimed in claim 17 wherein the means to bleed fluid from the stator structure comprises a porous member.

* * * * *